J. C. ROSS & M. A. PRUGH.
LUBRICATING HUB.
APPLICATION FILED MAR. 24, 1913.
1,161,977.
Patented Nov. 30, 1915.
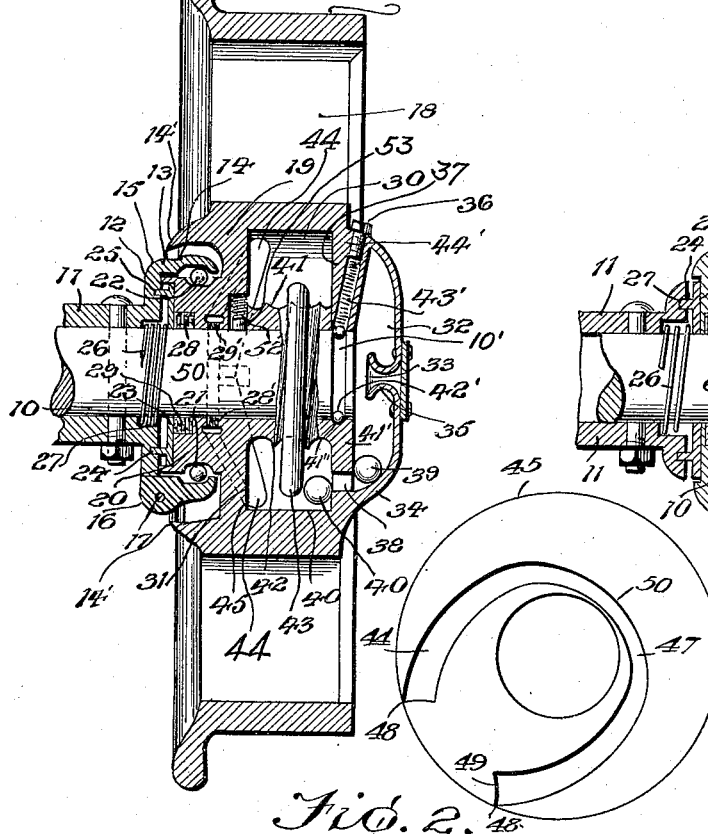

UNITED STATES PATENT OFFICE.

JOHN C. ROSS AND MARION A. PRUGH, OF GREENSBURG, PENNSYLVANIA.

LUBRICATING-HUB.

1,161,977.  Specification of Letters Patent.  Patented Nov. 30, 1915.

Application filed March 24, 1913. Serial No. 756,555.

*To all whom it may concern:*

Be it known that we, JOHN C. ROSS and MARION A. PRUGH, citizens of the United States, residing at Greensburg, in the county of Westmoreland and State of Pennsylvania, have invented certain new and useful Improvements in Lubricating-Hubs, of which the following is a specification.

This invention relates to an improvement in lubricating devices for wheels.

For a full understanding of the invention, reference is to be had to the following description and accompanying drawings, in which:

Figure 1 is a sectional view; Fig. 2 is a detail view illustrating one of the heating mechanisms for the lubricant; Fig. 3 is a sectional view showing a modified construction; Fig. 4 is a detail view of the lubricant conveying member illustrated in Fig. 1.

Corresponding and like parts are referred to in the following description and accompanying drawings by the same reference characters.

In the drawings, 10 designates the axle on which is mounted the sleeve 11. This sleeve is formed in two sections and provided with a flange 12 formed with an extension 13, the extension being rounded as at 14 and forming a ball race 15. A portion of the flange is cut away to receive a retaining lug 16 which is held in place by means of pins 17.

The wheel 18 is provided with the hub portion 19 which is formed with an extension 20, the extension 20 being provided with a ball race 21 in which the balls 22 are arranged. The lip or extension 14' of the wheel prevents dust and other foreign matter from entering the ball race, the balls locking the wheel on the sleeve against longitudinal movement. These balls contact with the inner concave face of the portion 14 of the extension of the flange 12. In this manner, the wheel is supported against displacement on the axle.

A plate 23 is arranged on the axle, said plate being provided with lugs 24 which are received within recesses 25 formed in the flange 12, the plate thus being supported against rotation. A coiled spring 26 embraces the axle and bears against said plate, the bore of the sleeve 11 being increased as at 27 to receive the spring.

The portion 20 of the hub is provided with a recess 28 in which packing 29 is arranged. The plate 23 holds the packing 29 in the hub to retard the feed of the lubricant, thereby preventing waste of the same. The hub is provided with a second recess 28' in which packing 29' is arranged. The hub is formed with a chamber 30 from which the lubricant is supplied to the axle, and also provided with a second chamber 32 to which the lubricant is supplied through the opening 33. Particular attention is called to the formation of the chamber 32 adjacent said opening, the plate 34 which forms the outer wall of the chamber 32 being provided with curved extensions 35, which are disposed within the chamber and prevent the lubricant from passing out through the opening.

The partitioning wall 37 between the chambers 30 and 32 is provided with a port 38, the lubricant flowing through said port from the chamber 32 to the chamber 30. Balls 39 are arranged in the chamber 32 whereby the lubricant may be agitated and thus maintained in a liquid state so that it may be fed to the chamber 30. Balls 40 are arranged within the chamber 30, the balls agitating the lubricant within this chamber in order that it may be supplied in a manner to be hereinafter described to the axle.

The hub is provided with a sleeve or extension 41 which is disposed within the chamber 30, said sleeve being formed exteriorly with a spiral groove 42. A ring 43 is loosely mounted on the sleeve 41. It will be noted that as the wheel rotates, this ring co-acts with the balls 40 to agitate the lubricant, the spiral groove feeding the ring longitudinally of the extension. The axle 10 is provided adjacent its terminal with a groove 10', the adjacent portion 41' of the sleeve 41 being provided with a ball race 41'' in which the balls 42' are arranged. These balls are inserted through the passage 43' which is closed by means of the threaded plug 36. The balls which are arranged in the race thus formed coöperate with the balls 22 to support the wheel against displacement, it being noted that the balls 42' will support the wheel without the use of the balls 22, and while the two forms of retaining means have been illustrated in Fig. 1, either of the forms may be used independent of the other. Attention is called to the fact that as soon as the axle or bore of the hub wears, these balls will then form the bearing.

A lip 44 is secured to or formed integral with the wall 45 of the chamber 30. This lip is illustrated in detail in Figs. 3 and 4. The lip is substantially circular and is disposed eccentrically of the wall 45. Its central portion 47 embraces the sleeve 41 and its terminals 48 are disposed in spaced relation at the edge of the wall 45. The lip is provided with a channel 49 which gathers the lubricant at the edge of the chamber and conducts it to a recess 50. This recess is also in communication with the chamber 30, the surplus lubricant being returned to the chamber through said duct. Thus, it will be noted that as the wheel rotates, the lubricant will be agitated within the chamber 30 and conveyed by means of the lip 44 to the recess 50 which supplies it to the axle, the surplus lubricant being returned to the supply chamber.

The sleeve 41 is provided with a recess 52' in which is seated a plunger 53, the plunger being formed with a head, and a coiled spring being interposed between the head and the end of the recess. The plunger is formed of copper, and its head contacts with the axle 10. This frictional engagement of the plunger with the axle heats the plunger and the heat thus generated is transmitted to lubricant in the chamber 30 and thereby thins it out in order that it may be fed freely to the axle. It will be noted by this construction that the lubricant will be thinned in proportion to the speed at which the wheel travels, thereby feeding more freely when the speed of the wheel increases, the supply of lubricant being consistent with the speed at which the wheel travels.

In the form shown in Fig. 3, the hub 57 is provided with a chamber 58 to which the lubricant is supplied through the opening 59. This chamber is divided into a plurality of compartments by the flange 60 of the sleeve 61 which is formed integral with the hub, the edge portions of the flange being spaced sufficiently from the wall 62 of the chamber 58 to permit the lubricant to flow to the inner compartment of the chamber. The lubricant is then conducted by means of a lip 63 to a duct 64 which communicates with the bore of the sleeve, thereby supplying the lubricant to the axle.

In the form shown in Fig. 2, the face 45 of the hub portion 19 is provided with an eccentrically disposed duct 82 which embraces the axle receiving bore of the hub. The terminals 83 of this duct are disposed adjacent the edge of the wall 45 where they may accumulate lubricant as do the lower terminals of the rib 44 illustrated in Fig. 4. A copper wire 84 is arranged in the duct 82, being looped at 85 and extending through an opening 85' in the portion 19 of the hub, contacting with the axle. The friction created as the wheel rotates heats the wire which then thins the oil as it passes through the duct and is supplied to the axle through the opening 85.

While the construction is illustrated as applied to car wheels, it will be obvious that the device is adapted for use with pulleys or, in fact, wherever a rotating member is mounted on a fixed shaft.

The many advantages of a construction of this character will be clearly apparent, as it will be seen that the arrangement is such as may be readily applied to axles and that in use the device will feed lubricant to the axles whenever the wheels are in motion.

What we claim is:—

1. A lubricating hub having a chamber provided with a radial inner wall and a port leading from the chamber to the bore of the hub, and a lubricant conducting lip on said radial wall having branches extending eccentrically to the axis of the hub and at their inner ends in communication with said port, the lip being so arranged that upon rotation of the hub in one direction one branch will conduct lubricant to the port and the other branch conduct excess lubricant from the port.

2. A lubricating hub having a chamber provided with a radial inner wall and a port leading from the chamber through said wall to the bore of the hub, and a lubricant conducting lip upon said wall of the chamber eccentric to the axis of the chamber and communicating laterally at its center with the port and having branches leading from said center past opposite sides of the bore of the hub, the outer ends of said branches being open and spaced apart at one side of said chamber, and the said branches being concave and forming lubricant conducting channels presented toward the axis of the hub, the channels decreasing in depth and width from the outer to the inner ends of the said branches of the lip.

In testimony whereof we affix our signatures in presence of two witnesses.

JOHN C. ROSS. [L. S.]
MARION A. PRUGH. [L. S.]

Witnesses:
J. Q. TRUXAL,
PAUL L. FEIGHTNER.

Copies of this patent may be obtained for five cents each, by addressing the "Commissioner of Patents, Washington, D. C."